Aug. 14, 1945.　　　　A. LOVE　　　　2,382,016
AIRCRAFT CONTROL
Filed Aug. 16, 1941　　　2 Sheets-Sheet 1
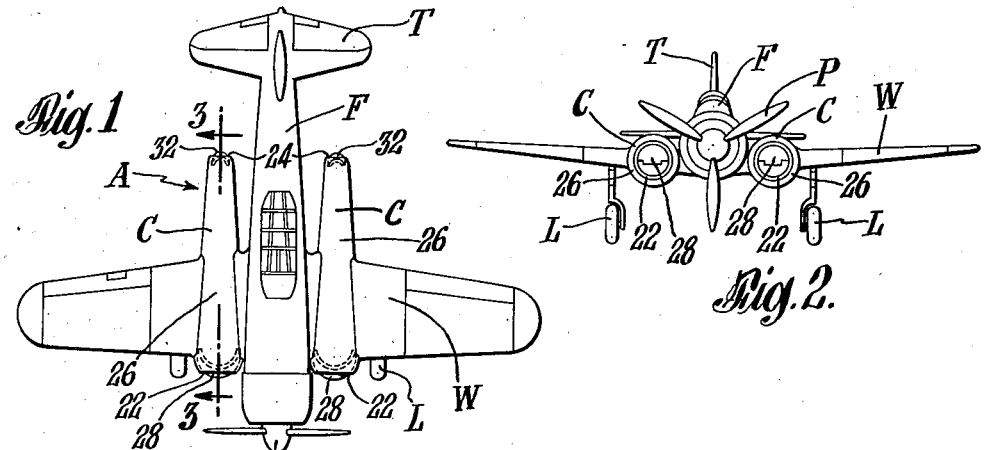
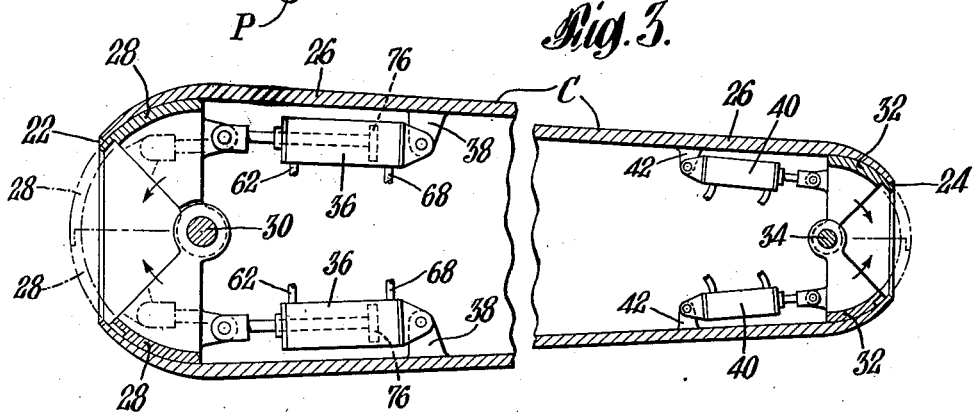
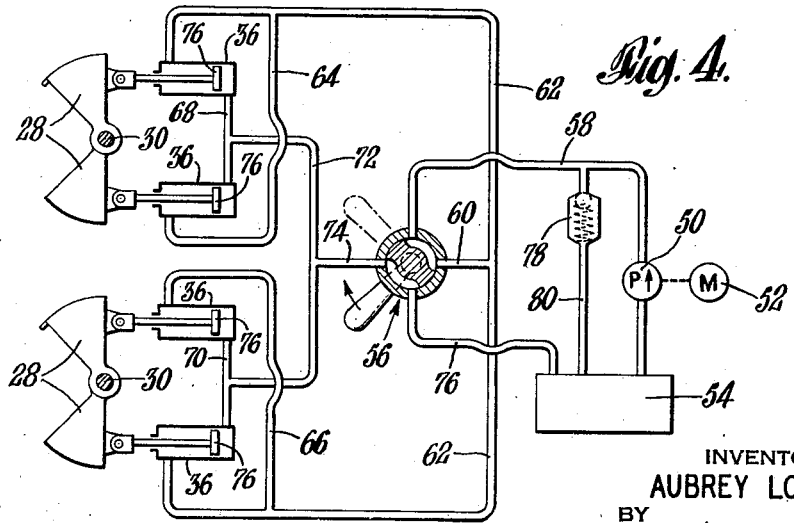
INVENTOR
AUBREY LOVE
BY
Alfred E. Page
ATTORNEY Aug. 14, 1945.　　　　　A. LOVE　　　　　2,382,016
AIRCRAFT CONTROL
Filed Aug. 16, 1941　　　2 Sheets-Sheet 2
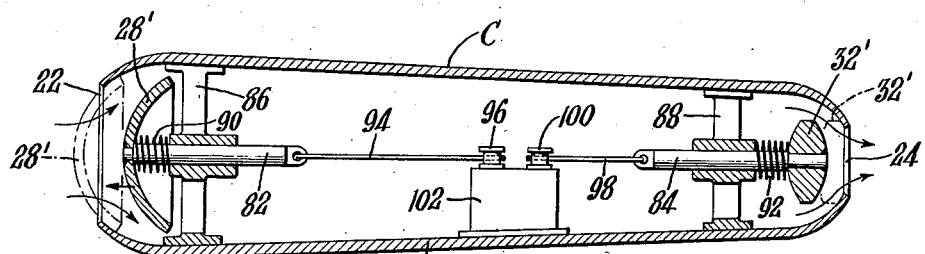
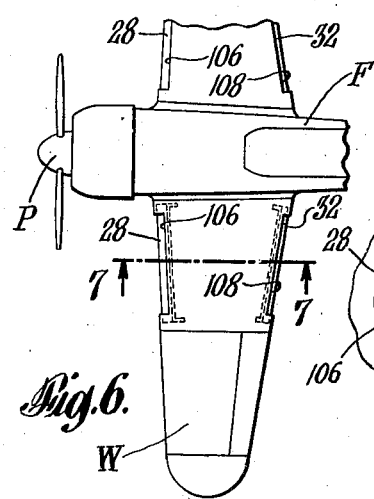
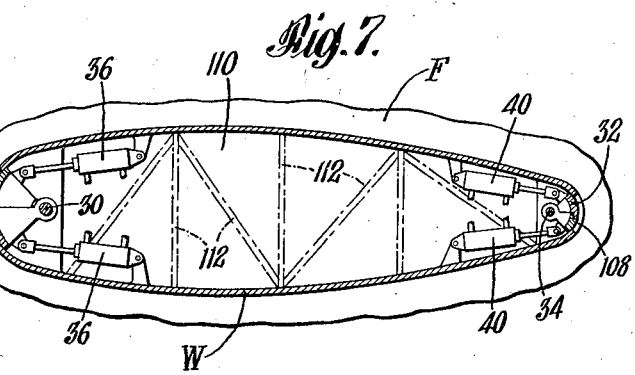
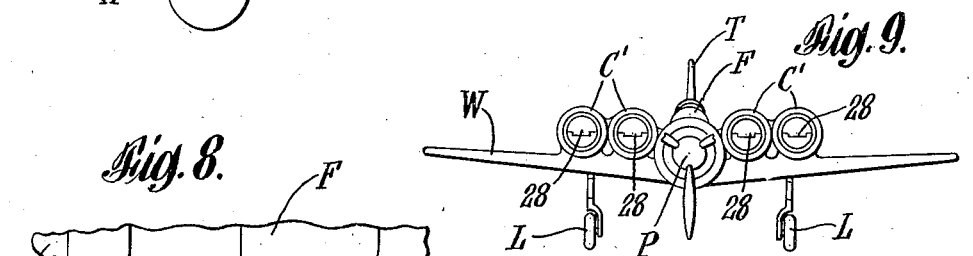
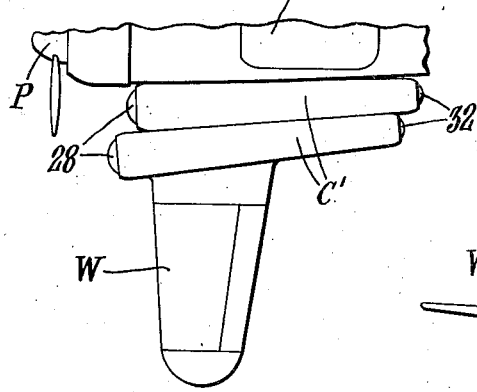
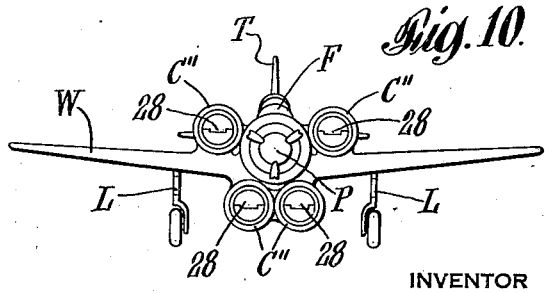
INVENTOR
AUBREY LOVE
BY Alfred E. Page
ATTORNEY Patented Aug. 14, 1945

2,382,016

UNITED STATES PATENT OFFICE 2,382,016

AIRCRAFT CONTROL

Aubrey Love, Ridgewood, N. J., assignor of one-fourth to Edward J. Garity, New York, N. Y.

Application August 16, 1941, Serial No. 407,243

7 Claims. (Cl. 244—113)

This invention relates to aircraft control and more particularly to apparatus for rapidly varying the speed of airplanes in flight without change in the engine or propeller speed and independently of the lifting surfaces of the airplane.

Under certain conditions of operation, it becomes desirable to provide for braking the speed of airplanes. Thus, in landing an airplane, an appreciable decrease in landing speed will enable the plane to land in a much shorter distance. Thereby, small airports, otherwise unadapted to the use of high speed heavy planes, can be used effectively for emergency landing fields.

A powerful braking means would be of considerable assistance in preventing aircraft accidents. For instance, when a plane is flying "blind" and an obstacle, such as a mountain or other highly elevated point, looms up, the pilot can avert collision by suddenly and rapidly checking the speed of the plane.

Similarly, in the science of military aeronautics, means for rapidly varying the speed of a plane in flight without changing the engine speed, would be of great value. In aerial gunnery, the aiming of a gun is calculated with respect to the estimated constant speed and the direction of the target. If the speed of the target, such as another plane, is suddenly and rapidly varied, the accuracy of the opponent's gun fire is substantially destroyed.

In dive bombing, means for effectively checking the speed of the dive bomber at the limit of its dive will greatly increase the accuracy of control of the plane. In the horizontal or level bombing of ground targets, a momentary and substantial reduction in the bomber's speed will greatly improve the accuracy of the bombing.

While many solutions of the problem of rapidly varying the speed of a plane in flight have been proposed, substantially none have proven feasible due to interference with other performance characteristics of the plane, excessive stress on structural parts and complications of control design.

It is therefore among the objects of this invention to provide apparatus for rapidly varying the speed of flying aircraft without changing the engine or propeller speed; to provide such apparatus which is efficient, subject to simple control, and effective; to provide an airplane braking means operative by throttling or interrupting the flow of air past the aircraft; to provide an airplane brake which is integral with the structure of the airplane and which, when not in use, offers substantially no resistance to movement of the airplane; to provide an airplane braking means which operates by varying the inflow and outflow of air through a confined space integral with the airplane; and to provide an easily controllable airplane braking means the main portion of which is integral with, or a part of, the wing structure of the plane.

These and other objects of the invention will in part be obvious and in part become apparent from the following description and accompanying drawings, in which:

Fig. 1 is a top plan view of an aircraft embodying the principles of the present invention;

Fig. 2 is a front elevational view of the aircraft illustrated in Fig. 1;

Fig. 3 is a sectional view on the line 3—3 of Fig. 1, looking in the direction of the arrows;

Fig. 4 is a diagrammatic representation of one form of control system applicable to the present invention;

Fig. 5 is a view similar to Fig. 3 illustrating a modified embodiment of the principles of the invention;

Fig. 6 is a partial top plan view of an aircraft illustrating another form in which the principles of the invention may be embodied;

Fig. 7 is a sectional view on the line 7—7 of Fig. 6, looking in the direction of the arrows;

Fig. 8 is a partial top plan view of an aircraft illustrating still another form in which the principles of the invention may be embodied; and Figs. 9 and 10 are front elevational views of aircraft illustrating two modes of applying the principles of the present invention.

Generally speaking, according to the principles of the present invention, the speed of aircraft is rapidly varied by enclosing or confining at least a portion of the air passing rearwardly around an aircraft to form a confined stream. Such confined stream is then controllably throttled to vary the air resistance to forward motion of the aircraft. The air may be forced to flow through a confined space within the wing structure of the aircraft, or integral therewith, and the exit of the air from such confined space is at least partially impeded, or may be prevented, to exert a "drag" on the aircraft. The exit of the confined space preferably is of less area than the entrance thereto, and the areas of the entrance and exit are controllably varied to vary the amount of braking effect exerted on the aircraft. Desirably the exit area is maintained substantially smaller than the entrance area, or as stated above, the exit may be closed completely. The entrance area may be several times the exit area, and preferably the entrance area is at least three times the exit area.

The apparatus may comprise one or more conduit means, such as cylindrical or tapering funnels, extending substantially parallel to the fuselage and preferably decreasing in cross-sectional area from entrance to exit although the conduit means may have an "hourglass" shape. Means are provided to vary the entrance opening to vary the volume of air entering the conduit means, and other and independent means are provided to vary the exit opening to vary the volume of air leaving the conduit means, or the exit opening may be permanently closed. Preferably the conduit means are streamlined and merge smoothly with the remainder of the aircraft. The closures likewise merge smoothly with the conduit means so that, when closed, substantially no increased resistance is imparted to air flow over the aircraft surfaces. The conduit means are integral with the wing structure, and may be formed as part of the wing structure. In any event, the conduit means or "brake housings" are preferably made of the same material as the remainder of the airplane.

One form in which the principles of the invention may be embodied is illustrated in Figs. 1 through 3. Referring to these figures, an aircraft A is illustrated as comprising a fuselage F, wing structure W, tail structure T, propeller P and landing gear L. The aircraft A, although shown as a low wing monoplane, may be of any type, and the invention is understood not to be limited to any particular type of aircraft.

According to the principles of the invention, the aircraft A is provided with one or more conduit means, such as conduits C, formed integral therewith and extending substantially parallel with the fuselage. The conduits C may be merged into the wing structure W and may be of any suitable length but preferably are at least as long as the width of the wing and may be nearly the length of the fuselage. The conduit means are made sufficiently light in weight that the total weight of the aircraft remains the same or, at the most, is only slightly increased.

Conduits C may be formed with an entrance 22 and an exit 24, each provided with closures merging with the conduit wall 26. The area of entrance 22 may be varied by closures 28 comprising a pair of doors pivotally mounted on a shaft 30. Similarly, the area of exit 24 may be varied by closure doors 32 pivotally mounted on a shaft 34. In some types of planes, the rear ends of conduits C will be permanently closed.

Any suitable means may be provided for operating doors 28 and 32. In Figs. 2 and 3, operating means are illustrated as comprising hydraulic cylinders 36, each pivotally connected to a door 28 and to an ear 38 on the inner surface of wall 26. Similar cylinders 40, independently controlled, are provided for doors 32.

In the control system for doors 28, as shown in Fig. 3, a pump 50 is provided, driven by a motor 52, and connected to a fluid reservoir 54. Control is effected by a valve 56 which controls the flow of fluid to the two pairs of cylinders 36 controlling the forward closures 28 for the pair of conduits C shown in Fig. 1. In the position of the valve 56 shown in solid lines, fluid is forced by pump 50 from reservoir 54 and conduit 58 to valve 56, whence it flows through conduits 60, 62, 64, and 66 to the left ends of cylinders 36. Fluid from the right ends of the cylinders flows through conduits 68, 70, 72, and 74 to valve 56, and thence through conduit 76 to reservoir 54. As shown, pistons 76 are moved to the right, opening closures 28. When valve 56 is moved to the position shown in dotted lines, pistons 76 will be moved to the left to close doors or closures 28. With the valve 56 in an intermediate position, the flow of fluid from pump 50 to cylinders 36 is interrupted and the pistons 76 will remain in a set position. Under these circumstances, if pump 50 continues to operate, fluid is returned to reservoir 54 through check valve 78 and conduit 80.

A similar control system may be provided for the closure doors 32. The control system forms no part of the present invention, and any suitable control may be used. For instance, the closures may be closed electrically or mechanically. Fig. 5 is illustrative of a mechanical control in which closures 28' and 32' are secured to plungers 82 and 84, respectively. The plungers are slidably mounted in stanchions 86 and 88, and the doors are urged to closed position by springs 90 and 92. A cable 94 passing around a pulley 96 and into the fuselage F is provided to open door 28', and a similar cable 98 and pulley 100 are provided to open doors 32'. Pulleys 96 and 100 may be replaced by reels operated by electric motors mounted in pulley support 102. It will be noted that both closures 28' and 32' are streamlined to minimize air resistance.

Preferably the controls for the braking means are disposed adjacent the main controls for the aircraft. However, in certain types of aircraft, such as heavy bombers, a portion of the controls may be adjacent the pilot and the remainder in the mid-section of the fuselage. Alternatively, all the braking controls may be located in the fuselage elsewhere than adjacent the pilot's compartment. If desired, and within the scope of the invention, the braking means may be automatically controlled, if necessary or desirable. Such automatic control may be desirable where the braking means are used to remedy instability of the plane or to correct nose dives and tailspins. The several braking means may be individually controlled to effect control of the course of the aircraft, as explained more fully hereinafter.

Figs. 6 and 7 illustrate a construction in which the conduit means are formed within the wing structure of the plane. As shown, openings 106 and 108 are formed in the forward and rear surfaces of the wing, respectively, and provided with the closures 28 and 32. Partitions 110 are provided to form the side walls of the conduit means. In this construction, as well as in those previously described, the structural members 112 of the wing structure are carried right through the conduits, and additional bracing means may be provided for the conduits if necessary or desirable.

The number of brake housings, conduits or funnels used will depend entirely on the size, weight and speed of the airplane to which they are to be applied, and upon limitations of structural design. When more than two conduits are found necessary, they may be arranged in sets of two or more, and the sets may be symmetrically arranged in pairs of sets with respect to the fuselage and wing structure. In the use of multiple brakes, all units of each set will be operated simultaneously or in synchronism.

Figs. 8, 9, and 10 illustrate various arrangements in which such pairs of sets of multiple conduits may be arranged. While, in these figures, each set is illustrated as including only two conduits, it should be understood that the number of individual conduits in each set may be as large as necessary or desirable. Thus, in Figs. 8 and 9, a set of two individual conduits C' is provided on each side of the fuselage. The inner conduits are "nested" with the fuselage, and the outer conduits are "nested" into the inner conduits. If three or more conduits are used in each set, each succeeding conduit is "nested" into the next adjacent inward conduit.

In Fig. 10, each set comprises one conduit C" above the wing structure and one conduit C" below the wing structure. The sets are symmetrically arranged with respect to the longitudinal axis of the fuselage. Another arrangement of Fig. 10 would be to provide three conduits for each set, two below the wing structure and one above.

From the foregoing description, the operation of the braking means should be easily understood. Assume that an airplane is travelling at a substantially constant speed and that it becomes necessary to suddenly check the speed. The pilot, or other operator, actuates the controls for the closures 28 or 28", opening the entrance to the braking conduits. The large volume of air rushing into the conduit exerts the same effect on the speed of the plane that a parachute does in checking vertical defense. At the same time, by opening the rear closures 32, 32' a predetermined amount, the degree of braking may be controlled. Meanwhile, the engine speed remains constant, but the speed of the airplane is checked by the drag effect of the braking means. If now, the front closures are closed, leaving the rear closures open to permit egress of the entrapped air, the speed of the plane will be rapidly accelerated.

By operating the braking means individually, such as by actuating the right hand brake alone, control of the plane may be effected to cause a sudden change in direction. Similarly, in dive bombing, if a brake above the wing structure is actuated, the airplane may be made to pull out of the dive very quickly. It will be appreciated that such controls, effecting sudden changes in speed and course, will be greatly effective in military tactics in increasing the maneuverability of the airplane and throwing opposing gunfire off its target. The controls are particularly effective in enabling a fighter airplane to obtain a strategic advantage over its opponent, such as by getting "on" the opponent's tail structure.

While the conduits have been shown as extending substantially parallel to the fuselage, they may point upwardly or downwardly a slight amount depending on stability characteristics of the airplane. Additionally, the undersides of the conduits may be concave in accordance with accepted principles of aerodynamic design. Furthermore, to help maintain stability and buoyancy of the airplane under braking conditions or at low speeds, powerful propellors may be mounted in the conduits or funnels to draw large volumes of air in or through.

It will be appreciated that the controls may be effectively used to prevent or counteract nose dives or tailspins. Also, their use will enable heavy high speed planes to approach small airports at a steep approach angle and land thereon at relatively low speeds.

While various specific embodiments of the invention have been shown and described to illustrate how the principles of the invention may be applied, it should be understood that these are for the purpose of illustration only and are not to be taken as limiting the scope of the invention. It will be obvious to those skilled in the art that the invention may be variously embodied depending upon the size and type of aircraft and the amount of braking desired. In all instances, the conduit means should be integral with the aircraft structure, or effectively tied in thereto, to prevent disintegration due to aerodynamic stresses. The control of the closures may be effected in any expedient manner, and the dimensions and interrelation of parts changed to adapt the invention to any specific installation.

What is claimed is:

1. Apparatus for continuously controlling the speed of an airplane in flight independently of the propelling means and lifting control surfaces thereof comprising, in combination, enclosed conduit means integral with the wing structure of the airplane on each side of and outside the fuselage, and extending parallel to the fuselage; the cross-sectional area of said conduit means decreasing from entrance to exit to throttle the flow of air therethrough and the rate of decrease being substantially uniform over most of the length of said conduit means; closure means for varying the cross-sectional area of the entrance to said conduit means to vary the volume of air entering thereinto; closure means for varying the cross-sectional area of the exit of said conduit means to vary the volume of air discharged therefrom; and independent continuously operative control means for each of said closure means.

2. Apparatus for continuously controlling the speed of an airplane in flight independently of the propelling means and lifting control surfaces thereof comprising, in combination, enclosed conduit means integral with the wing structure of the airplane on each side of and outside the fuselage, and extending parallel to the fuselage; the cross-sectional area of said conduit means decreasing from entrance to exit to throttle the flow of air therethrough and the rate of decrease being substantially uniform over most of the length of said conduit means; closure means for varying the cross-sectional area of the entrance to said conduit means to vary the volume of air entering thereinto; closure means for varying the cross-sectional area of the exit of said conduit means to vary the volume of air discharged therefrom; and independent continuously operative control means for each of said closure means; said closure means merging smoothly with said conduit means to provide a streamline flow of air thereover.

3. Apparatus for continuously controlling the speed of an airplane in flight independently of the propelling means and lifting control surfaces thereof comprising, in combination, a pair of conduits integral with the wing structure of the airplane and outside the fuselage thereof, said conduits being disposed one on each side of the fuselage and extending parallel thereto; the cross-sectional area of said conduits decreasing from entrance to exit to throttle the flow of air therethrough and the rate of decrease being substantially uniform over most of the length of said conduits; closure means for varying the cross-sectional area of the entrance to each conduit to vary the volume of air entering thereinto; closure means for varying the cross-sectional area of the exit of each conduit to vary the volume of air discharged therefrom; and independent continuously operative control means for the entrance and exit closure means of each conduit.

4. Apparatus for continuously controlling the speed of an airplane in flight independently of the propelling means and lifting control surfaces thereof comprising, in combination, two pairs of partitions integral with the wing structure of the airplane and each pair defining, with the wing surfaces, a conduit through the wing structure outside the airplane fuselage, said conduits being disposed one on each side of the fuselage and extending parallel thereto; the cross-sectional area of said conduits decreasing from entrance to exit to throttle the flow of air therethrough; closure means for varying the cross-sectional area of the entrance to each conduit to vary the volume of air entering thereinto; closure means for varying the cross-sectional area of the exit of each conduit to vary the volume of air discharged therefrom; and independent continuously operative control means for the entrance and exit closure means of each conduit; said closure means in the closed position conforming to the surface of the wing structure.

5. Apparatus for continuously controlling the speed of an airplane in flight independently of the propelling means and lifting control surfaces thereof comprising, in combination, two sets of conduits integral with the wing structure of the airplane and each comprising at least two conduits, each set being disposed outside the aircraft fuselage with one set on each side of the longitudinal centerline of the aircraft and the conduits of each set extending parallel to the fuselage; the cross-sectional area of said conduits decreasing from entrance to exit to throttle the flow of air therethrough and the rate of decrease being substantially uniform over most of the length of said conduits; closure means for varying the cross-sectional area of the entrance to each conduit to vary the volume of air entering thereinto; closure means for varying the cross-sectional area of the exit of each conduit to vary the volume of air discharged therefrom; and independent continuously operative control means for the entrance and exit closure means of each conduit.

6. Apparatus as claimed in claim 5 in which the conduits are integral with the upper portion of the wing structure.

7. Apparatus as claimed in claim 5 in which half the total number of conduits are integral with the upper portion of the wing structure and the remaining conduits are integral with the lower portion of the wing structure.

AUBREY LOVE.